(12) United States Patent
Schwaiger et al.

(10) Patent No.: US 10,359,328 B1
(45) Date of Patent: Jul. 23, 2019

(54) TENSION GAUGE FOR BANDSAW BLADES

(71) Applicants: Barry Martin Schwaiger, Murfreesboro, TN (US); Howard Leon Snodgrass, Jr., Christiansburg, VA (US)

(72) Inventors: Barry Martin Schwaiger, Murfreesboro, TN (US); Howard Leon Snodgrass, Jr., Christiansburg, VA (US)

(*) Notice: Subject to any disclaimer, the term of this patent is extended or adjusted under 35 U.S.C. 154(b) by 0 days.

(21) Appl. No.: 15/897,339

(22) Filed: Feb. 15, 2018

Related U.S. Application Data

(60) Provisional application No. 62/459,664, filed on Feb. 16, 2017.

(51) Int. Cl.
*G01L 5/00* (2006.01)
*G01L 5/06* (2006.01)
*B23D 59/00* (2006.01)
*B23D 55/06* (2006.01)

(52) U.S. Cl.
CPC .............. *G01L 5/06* (2013.01); *B23D 55/06* (2013.01); *B23D 59/001* (2013.01)

(58) Field of Classification Search
CPC .......... G01L 5/06; B23D 55/06; B23D 59/001

USPC ..................................................... 73/862.451
See application file for complete search history.

(56) References Cited

U.S. PATENT DOCUMENTS

| | | | | |
|---|---|---|---|---|
| 3,698,244 A | * | 10/1972 | Deming | G01L 5/06 73/862.453 |
| 4,444,065 A | * | 4/1984 | Okamuro | G01L 5/06 73/862.453 |
| 4,607,535 A | * | 8/1986 | Okamuro | G01L 5/06 73/862.453 |
| 4,706,508 A | | 11/1987 | Hjertberg et al. | |
| 4,747,314 A | * | 5/1988 | Huang | A63B 51/005 73/862.452 |
| 5,655,476 A | * | 8/1997 | Wolter | B66C 1/125 116/212 |

* cited by examiner

*Primary Examiner* — Max H Noori
(74) *Attorney, Agent, or Firm* — Shane Cortesi

(57) ABSTRACT

Devices and methods of measuring a handsaw or other cutting blade are described. The device may be in the form of a tension gauge that includes a first plate associated with a moveable protrusion such as a pin that deflects the blade and a second plate that is pivotably attached to the first plate and includes two or more fixed pins.

17 Claims, 7 Drawing Sheets

TENSION GAUGE FOR BANDSAW BLADES

BACKGROUND

Technical Field

The present application relates to tools for measuring the tension of bandsaw and other cutting blades.

Background of the Invention

The current systems used to measure handsaw blade tension are focused on two methods. A very common method integrated into most handsaws by the manufacturer is to measure the spring deflection of the movable wheel supporting the handsaw blade. A typical handsaw will have a movable upper wheel which is allowed to translate in a track whereby the two wheels stay coplanar. The upper wheel is supported by a coil spring which gets compressed as the handsaw blade is tensioned. The amount of compression on this spring is relatable to the amount of tension in the handsaw blade and is reported on a scale by handsaw blade width. The wider the handsaw blade the more tension or compression of the spring is desired. The pitfalls of these systems are that they are inherently not precise largely due to the crude mechanisms that indicate the compression to a scale. They are also prone to progressive error as the spring degrades and weakens in stiffness over time.

The second method involves a secondary instrument that clamps to the blade and reads the actual strain or stretch of the blade metal while under tension. This method requires a correlation to the actual stretch of the blade to a proper tension for the given blade which is a secondary calculation. One problem with this approach is that the hardened spring steel that the blades are made from stretch only a very small amount so it takes an expensive and sensitive instrument to measure this strain. Another problem with this is the time involved with setting the gauge in place to actually make the measurement. Additionally, these gauges are subject to "internal hysteresis" which causes a time lag in indication of the measurement.

U.S. Pat. No. 4,706,508 describes a tool for determining bicycle spoke tension consisting of two identical members pivoting in a scissors-like manner upon a screw retained sleeve. There is no discussion in the aforementioned patent that the tool may be used to measure the tension of a cutting blade.

BRIEF SUMMARY

The present disclosure relates to gauges and methods of measuring tension in a handsaw or other cutting blade.

In some embodiments, the present disclosure provides a method of measuring the tension of a motorized cutting blade comprising the steps of:

a) providing a motorized cutting device comprising a cutting blade comprising a plurality of teeth, and a motor configured to move the cutting blade, the cutting blade having a tension;

b) providing a tension gauge comprising a first plate, a moveable protrusion configured to deflect the cutting blade and attached to the first plate and a scale configured to measure deflection of the moveable pin and to notify a user of the tension of the cutting blade based on the measured deflection; and c) placing the cutting blade against the moveable protrusion to deflect the cutting blade and cause the scale to provide indicia of the tension of the cutting blade to the user.

In some embodiments, the moveable protrusion is in the form of a moveable pin. In some embodiments, the moveable pin is pressure biased under a pre-loaded force (e.g. spring-loaded). In some embodiments, the tension gauge comprises at least one fixed pin, the cutting blade comprises a first side and a second side opposite the first side and step c) comprises placing the first side of the cutting blade against the moveable pin and the second side of the cutting blade against the fixed pin. In some embodiments, the cutting blade comprises a third side oriented at approximately 90 degrees relative to the first side and the second side and the teeth are located on the third side. In some embodiments, the first plate comprises a first plate interior surface comprising the moveable pin and a pointer/needle, a first plate exterior surface opposite the first plate interior surface, a first plate first side and a first plate second side opposite the first side. In some embodiments, the tension gauge further comprises a second plate comprising a second plate exterior surface comprising at least two fixed pins, a second plate interior surface facing the first plate and opposite the second plate exterior surface, a second plate first side and a second plate second side opposite the second plate first side. In some embodiments, the second plate comprises an arc-shaped slot receiving the pointer/needle and the tension indicia. In some embodiments, the arc-shaped slot, the pointer/needle and the tension indicia comprise the scale. In some embodiments, the first plate is pivotably attached to the second plate by a pivot pin connecting the first plate to the second plate and creating a pivot axis, the second plate further comprises a pin slot receiving the moveable pin, and pivoting the first plate relative to the second plate along the pivot axis is configured to cause the pointer/needle to move along the arc-shaped slot and to cause the moveable pin to move along the pin slot to deflect the cutting blade. In some embodiments, step c) comprises placing the cutting blade against the moveable pin and the at least two fixed pins. In some embodiments, the first plate or the second plate comprises a ruler comprising distance measuring indicia spaced at regular intervals. In some embodiments, the exterior surface of the first plate comprises a first plate spring stop pin, the exterior surface of the second plate comprises a second plate spring stop pin, the tension gauge further comprises a spring having a first end attached to the first plate spring stop pin, a coil surrounding the pivot pin, and a second end attached to the second plate spring stop pin. In some embodiments, at least one of the first plate spring stop pin and the second plate spring stop pin comprise a screw and a pin body comprising a threaded interior configured to receive the screw, the pin body is positioned against the first or second end of the spring, and the screw and the pin body are located in an adjustment slot located in the first or second plate. In some embodiments, a side of the first plate and an opposite side of the second plate each comprise a handle. In some embodiments, the cutting blade is a handsaw blade and in the form of continuous band of toothed metal stretched between at least two wheels.

In still further embodiments, the present disclosure provides a method of measuring the tension of a motorized cutting blade comprising the steps of: a) providing a motorized cutting device comprising a cutting blade comprising a plurality of teeth, and a motor configured to move the cutting blade; b) providing a tension gauge comprising a first plate comprising a first plate interior surface comprising a moveable pin and a pointer/needle, a first plate exterior surface opposite the first plate interior surface, a first plate first side and a first plate second side opposite the first plate first side, a second plate comprising a second plate exterior surface comprising at least two fixed pins, a second plate interior surface facing the first plate and opposite the second plate exterior surface, a second plate first side and a second plate second side opposite the second plate first side. In some embodiments, the second plate comprises an arc-shaped slot receiving the pointer/needle and the tension indicia, and the arc-shaped slot, the pointer/needle and the tension indicia comprise a scale. In some embodiments, the first plate is pivotably attached to the second plate by a pivot pin connecting the first plate to the second plate and creating a pivot axis. In some embodiments, the second plate further comprises a pin slot receiving the moveable pin. In some embodiments, the method further includes: c) pivoting the first plate relative to the second plate along the pivot axis from a start position to a second position to cause the moveable pin to move within the pin slot and the pointer/needle to move within the arc-shaped slot. In some embodiments, the method further includes d) placing a first side of the cutting blade against the moveable pin and a second side of the cutting blade against the at least two fixed pins. In some embodiments, the method further includes e) pivoting the first plate relative to the second plate along the pivot axis from the second position to a measuring position located between the second position and the start position to cause the moveable pin to move within the pin slot and deflect the cutting blade and to cause the pointer/needle to move within the arc-shaped slot.

In some embodiments, the method further includes measuring the location of the pointer/needle after step e). In some embodiments, the method further includes after step e) removing the moveable pin and the at least two fixed pins from the cutting blade. In some embodiments, the first plate first side comprises a first plate handle comprising a first plate handle flange configured to contact the first side of the second plate when the first plate is in the second position and prevent further pivoting of the first plate away from the start position and further wherein the second plate second side comprises a second plate handle comprising a second plate handle flange configured to contact the second side of the first plate when the first plate is in the second position and prevent further pivoting of the first plate away from the start position. In some embodiments, the first and second plates are generally flat. In some embodiments, the interior surfaces of the first and second plates are generally flat. In some embodiments, the interior surfaces of the first and second plate are less than 0.25 inches apart.

BRIEF DESCRIPTION OF THE DRAWINGS

in FIG. 1, the tension gauge is in the second position.

in FIG. 2, the tension gauge is in the second position.

in FIG. 3, the tension gauge is in a measuring position (which is between the second position and the start position).

in FIG. 4, the tension gauge is in the measuring position.

in FIG. 5, the tension gauge is in the measuring position.

in FIG. 6, the tension gauge is in the measuring position.

DETAILED DESCRIPTION

Figure 1:
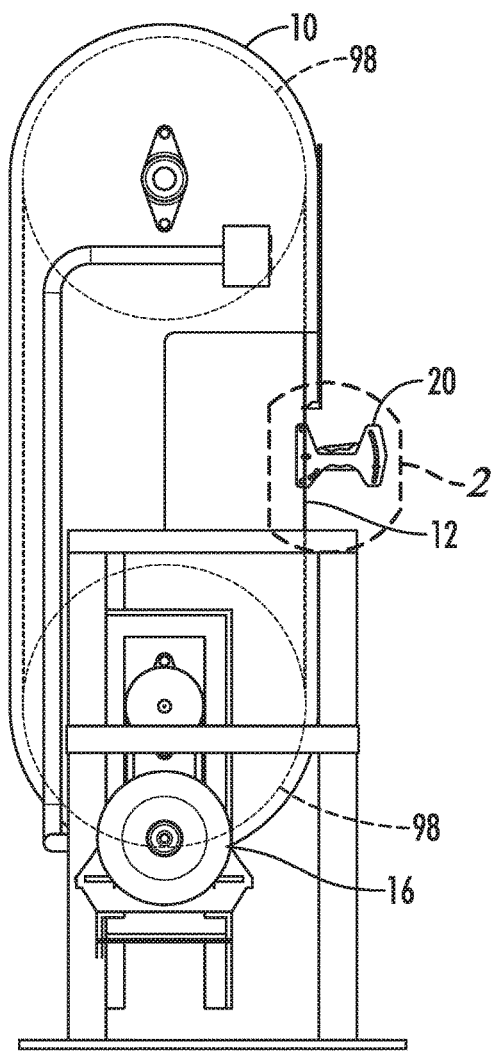
FIG. 1 illustrates a front elevation view of a torsion gauge of one embodiment of the invention being used to measure the tension of a handsaw blade.

With reference to FIGS. 1-9, the present invention provides a tension gauge generally designated by the numeral 20. In the drawings, not all reference numbers are included in each drawing for the sake of clarity.

Referring further to FIGS. 1-9, in some embodiments, the present disclosure relates to a tension gauge 20 that measures tension in a blade 12 of a cutting tool 10 such as a bandsaw by deflection using a lateral force of, for example, a moveable pin 24.

More particularly, in some embodiments, the present disclosure provides a method of measuring the tension of a motorized cutting blade 12 comprising the step of providing a motorized cutting device 10 comprising a cutting blade 12 comprising a plurality of teeth 14, and a motor 16 configured to move the cutting blade 12. The motorized cutting device 10 may be any suitable device, including without limitation, a bandsaw. As known to those of ordinary skill, bandsaw blades are generally in the form of a continuous band of toothed metal stretched between at least two wheels 98, and may be used to cut wood, metal or other substances.

Optionally, the method further includes providing a tension gauge 20 comprising a first plate 22 comprising a first plate interior surface 40 comprising a moveable pin 24 and a scale pointer/needle 42, a first plate exterior surface 44 opposite the first plate interior surface 40, a first plate first side 38 and a first plate second side 46 opposite the first plate first side 38, a second plate 48 comprising a second plate exterior surface 50 comprising at least two fixed pins 30A and 30B that are located a fixed distance apart and remain static (i.e., do not move), a second plate interior surface 52 facing the first plate 22 and opposite the second plate exterior surface 50, a second plate first side 54 and a second plate second side 56 opposite the second plate first side 54. Optionally, the second plate 48 comprises an arc-shaped slot 58 receiving the pointer/needle 42 and the tension indicia 28, and the arc-shaped slot 58, the pointer/needle 42 and the tension indicia 28 comprise a scale 26. Optionally, the first plate 22 is pivotably attached to the second plate 48 by a pivot pin 60 connecting the first plate 22 to the second plate 48 and creating a pivot axis 62. Optionally, the second plate 48 further comprises a pin slot 64 receiving the moveable pin 24 so that the moveable pin 24 protrudes through the pin slot 64, as best seen in FIGS. 2, 4, 6, 7 and 8.

Figure 2:
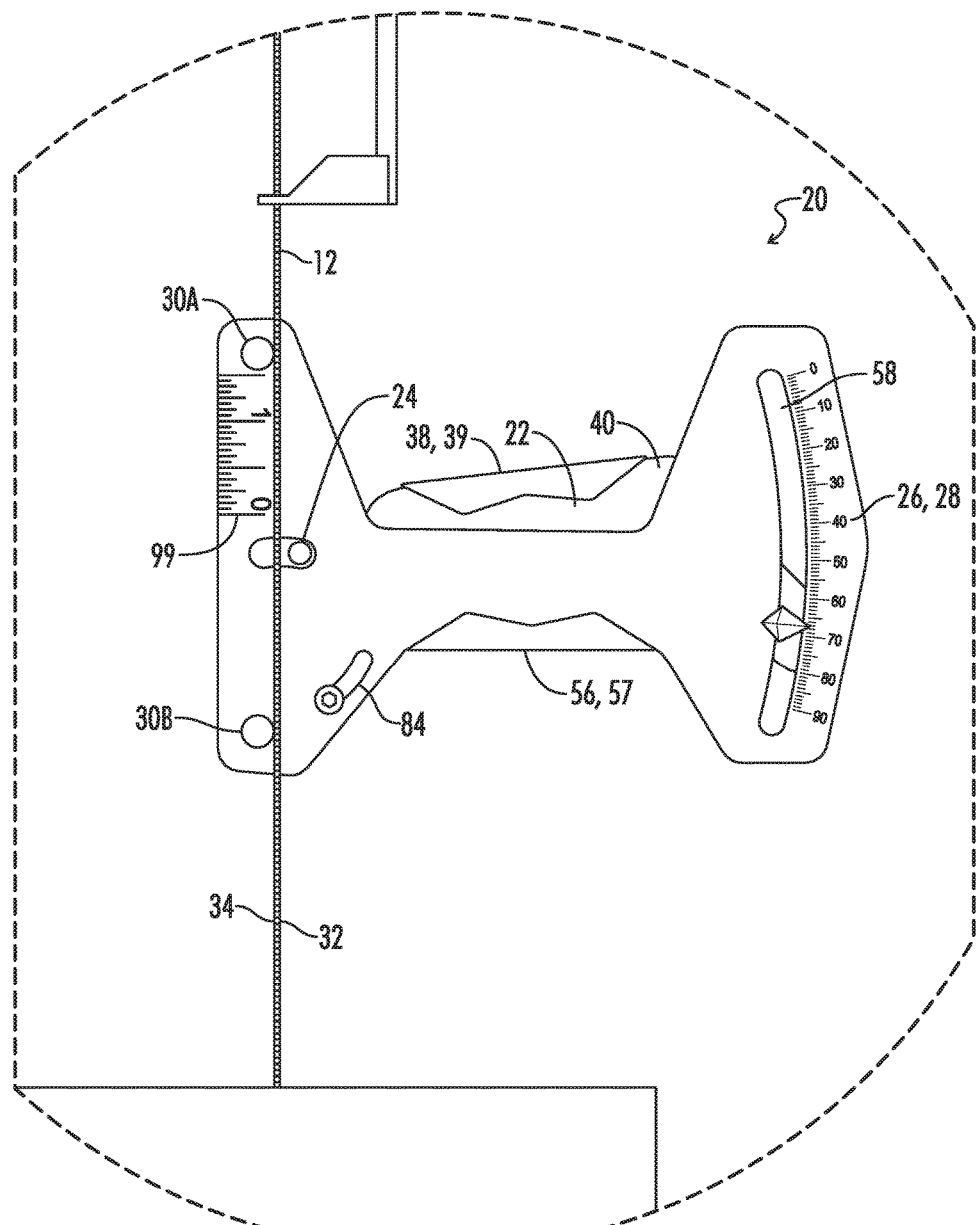
FIG. 2 illustrates a closeup front elevation view of the circled area in FIG. 1.
Figure 3:
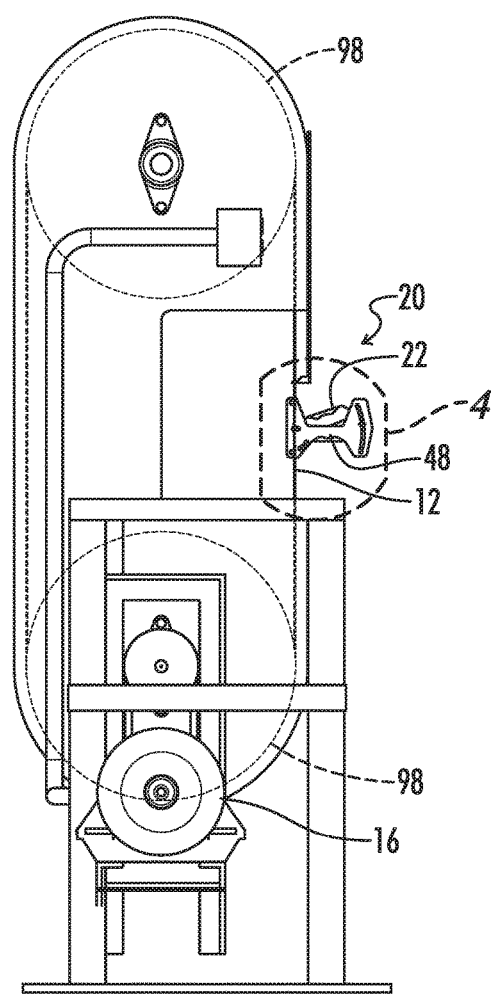
FIG. 3 illustrates a front elevation view of the handsaw and torsion gauge of FIG. 1.
Figure 4:
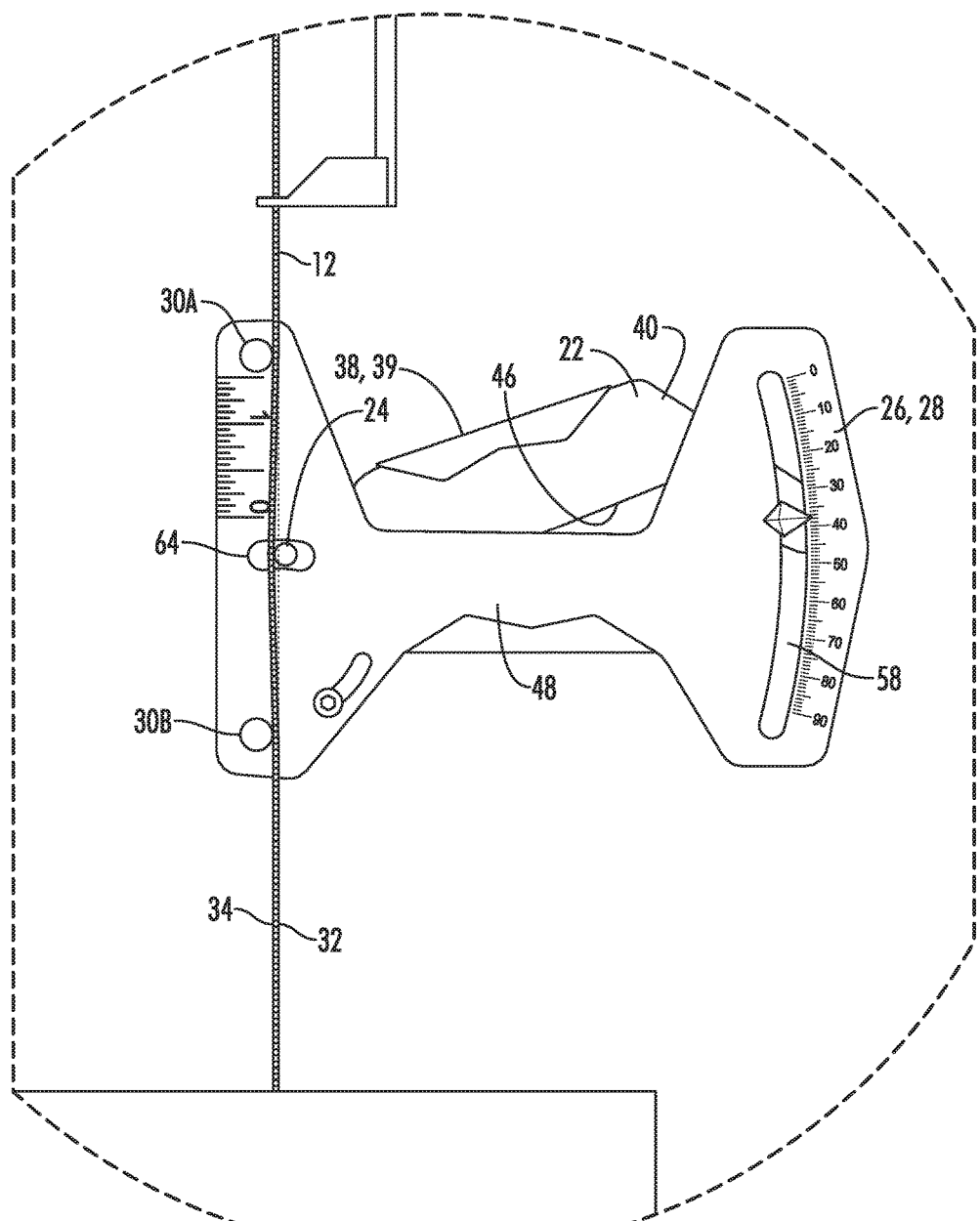
FIG. 4 illustrates a closeup front elevation view of the circled area in FIG. 3.
Figure 5:
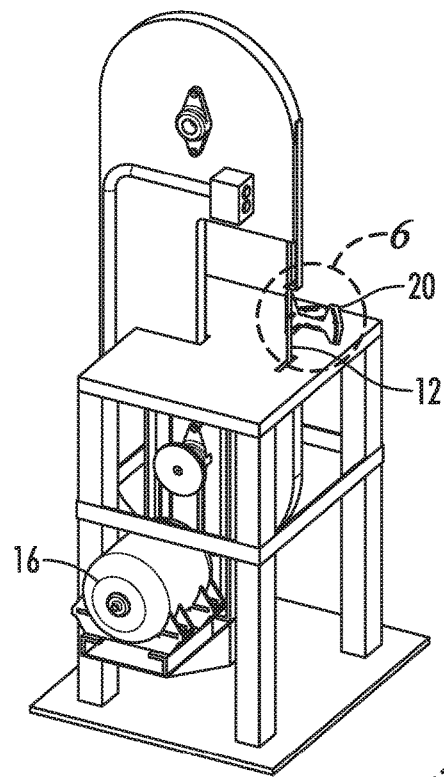
FIG. 5 illustrates a front perspective view of the bandsaw and tension gauge of FIG. 1.
Figure 6:
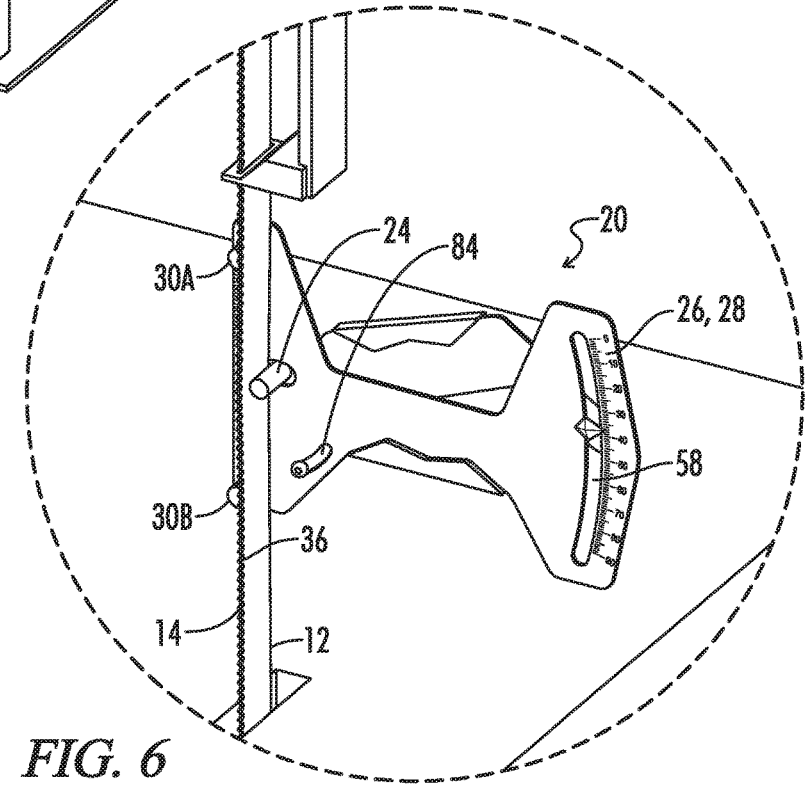
FIG. 6 illustrates a closeup, front perspective view of the tension gauge of FIG. 5.
Figure 7:
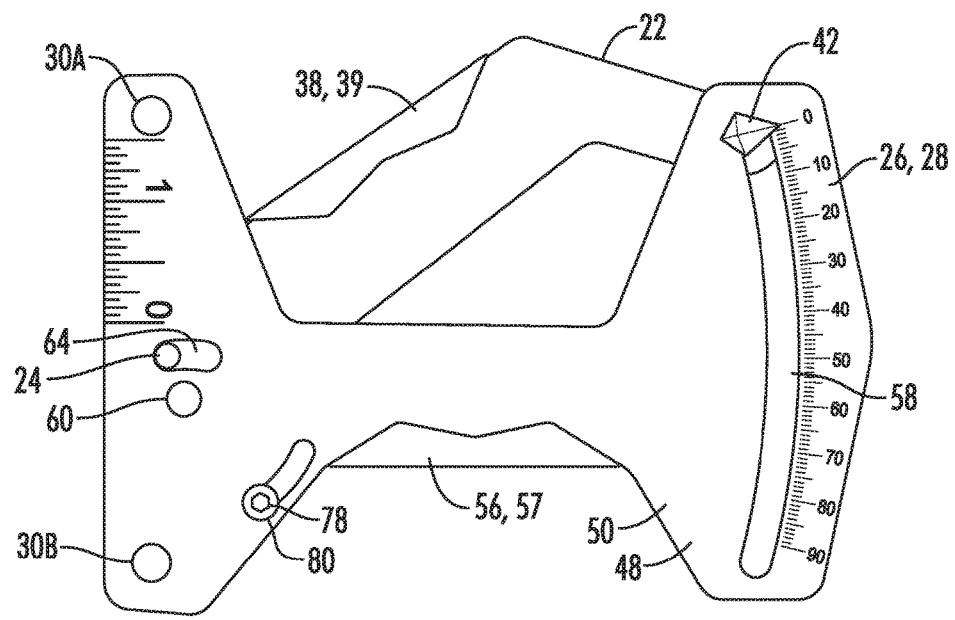
FIG. 7 illustrates a front elevation view of the tension gauge of FIG. 1 in the start position.
Figure 8:
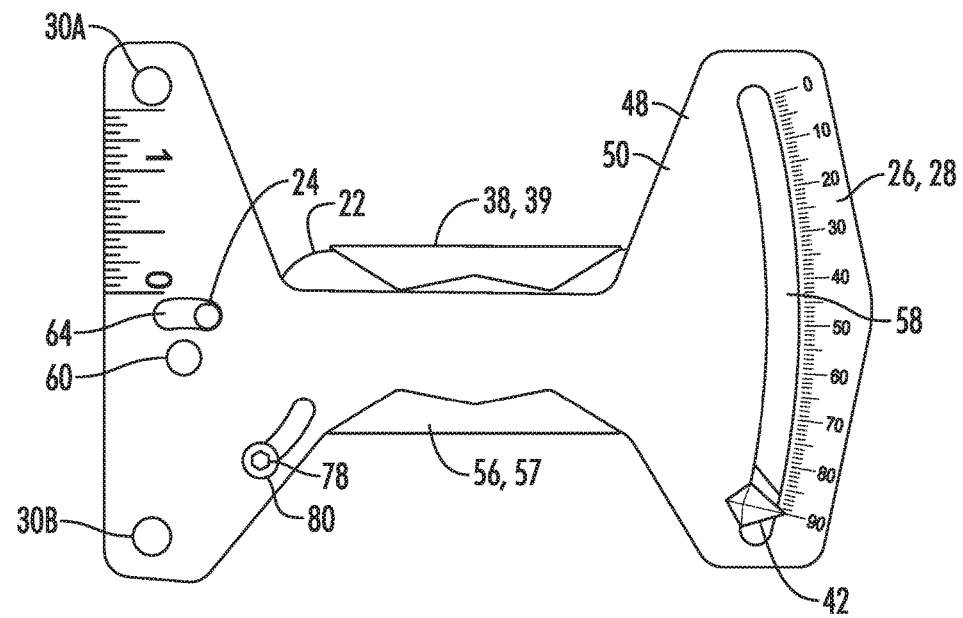
FIG. 8 illustrates a front elevation view of the tension gauge of FIG. 1 in the second position.
Figure 9:
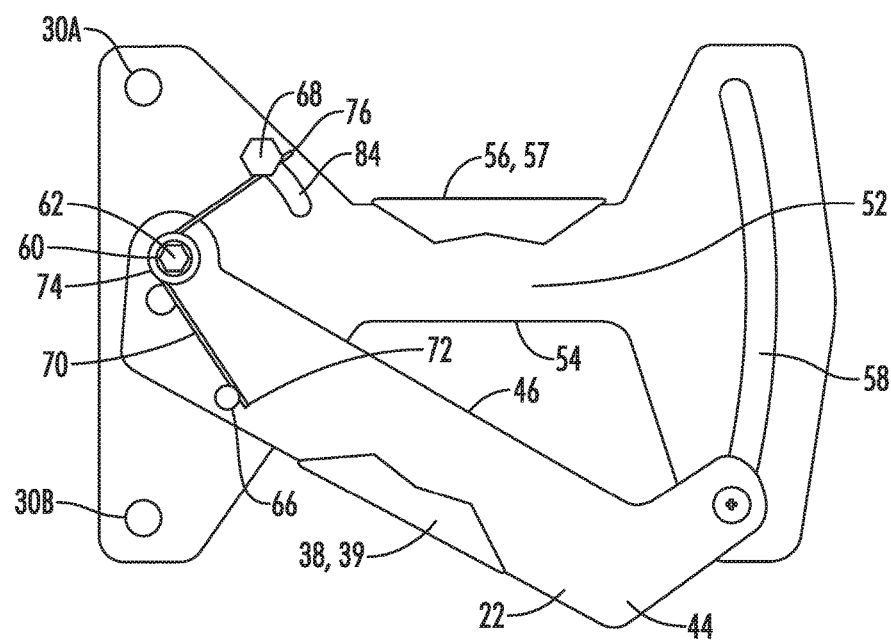
FIG. 9 illustrates a rear elevation view of the tension gauge of FIG. 1 in the start position.

Optionally, the method further includes pivoting the first plate 22 relative to the second plate 48 along the pivot axis 62 from a start position to a second position to cause the moveable pin 24 to move within the pin slot 64 and the pointer/needle 42 to move within the arc-shaped slot 58. More particularly, the user moves the first side of the first plate 38 (and the associated handle 39 of the first plate 22) towards the second side 56 of the second plate 48 and the associated handle 57 of the second plate 48. The start position is shown in FIGS. 7 and 9 and represents the relaxed state of the tension gauge 20. The second position is shown in FIGS. 1, 2, 8 and represents the fully compressed state of the tension gauge 20. The tension gauge 20 may be used in any suitable method. For example, in an exemplary method the human user grasps the first plate handle 39 with his or her thumb and the second plate handle 57 in his or her fingertips of the same hand and the user brings his or her thumb towards his or her fingertips to move from the start position to the second position. For clarity purposes, the human hand holding the tension gauge s not shown in FIGS. 1, 2 and 8.

Optionally, the method further includes placing a first side 32 of the cutting blade 12 against the moveable pin 24 and a second side 34 of the cutting blade 12 against the at least two fixed pins 30A and 30B so that the cutting blade 12 traverses between the moveable pin 24 and fixed pins 30A and 30B. Instead of a moveable pin 24, the tension gauge may include any other protrusion capable of deflecting the cutting blade 12 such as a bearing.

Optionally, the method further includes pivoting the first plate 22 relative to the second plate 48 along the pivot axis 62 from the second position to a measuring position (which is between the start position and the second position) to cause the moveable pin 24 to move within the pin slot 64 and toward the cutting blade 12 so as to deflect the cutting blade 12 and to cause the pointer/needle 42 to move within the arc-shaped slot 58. The measuring position is shown in FIGS. 3, 4, 5, and 6 and represents a partially compressed state of the tension gauge 20. To accomplish this, the user may, for example, relax his or her hand so that the tension gauge 20 moves from the second position to the measuring position.

Optionally, the method further includes the step of measuring the location of the pointer/needle 42. In other words, the pointer/needle 42 rests at a number or other reading (i.e., tension indicia) adjacent the arc-shaped slot 58 that corresponds to the amount of deflection of the blade 12 by the moveable pin 24; the greater the deflection, the lesser tension in the blade 12, and the lesser the deflection, the greater the tension in the blade 12.

Optionally, the method further includes the step of removing the tension gauge 20 from the cutting blade 12.

Optionally, the first plate first side 38 comprises a first plate handle 39 comprising a first plate handle flange configured to contact the first side of the second plate 54 when the first plate 22 is in the second position and prevent further pivoting of the first plate 22 away from the start position and further wherein the second plate second side 56 comprises a second plate handle 57 comprising a second plate handle flange configured to contact the second side 46 of the first plate 22 when the first plate 22 is in the second position and prevent further pivoting of the first plate 22 away from the start position—i.e., to prevent over pivoting of the first plate 22. The handle flanges refer to the fact that the first plate handle 39 and second plate handle 57 may be in the form of raised flanges, e.g., plastic guides that prevent over pivoting.

The tension gauge 20 may be comprised of any suitable material, including without limitation metal and/or plastic.

Optionally, the first and second plates 22 and 48 are generally flat with the exception of the moveable pin 24, pivot pin 60, the fixed pins 30A and 30B, the pointer/needle 42 and the handle flanges. Optionally, the first plate interior surface 40 and the second plate interior surface 52 are generally flat, similar to the interior of scissor arms. Optionally, the interior surfaces 40 and 52 of the first and second plate 22 and 48 are less than 0.25 inches apart, similar to a pair of scissor arms.

It will be understood that the moveable pin 24 moves away from the blade 12 when moving from the start position to the second position, and then towards the blade 12 when moving from the second position to the measuring position.

Optionally, the cutting blade 12 comprises a third side 36 oriented at approximately 90 degrees relative to the first side 32 and the second side 34 and the teeth are located on the third side 36.

Optionally, the moveable pin 24 is located approximately the same distance from the at least fixed pins 30A and 30B. The moveable pin 24 is preferably located slightly offset from the fixed pins 30A and 30B even in the start position, as best seen in FIG. 7, to accommodate the cutting blade 12.

Optionally, the second plate 48 comprises a blade measuring indicia 99 (shown in FIGS. 2, 4, 7 and 8) at regular intervals (e.g., similar to a ruler) adjacent to at least one of the at least two fixed pins 30A and 30B.

Optionally, the exterior surface 44 of the first plate 22 comprises a first plate spring stop pin 66, the exterior surface 50 of the second plate 48 comprises a second plate spring stop pin 68, and the tension gauge 20 further comprises a spring 70 (e.g., a torsion spring) having a first end 72 attached to the first plate spring stop pin 66, a coil 74 surrounding the pivot pin 60, and a second end 76 attached to the second plate spring stop pin 68. The torsion spring is best shown in FIG. 9.

Optionally, at least one of the first plate spring stop pin 66 and the second plate spring stop pin 68 comprise a screw 78 and a pin body 80 comprising a threaded interior configured to receive the screw 78, the pin body 80 is positioned against the first or second end 72 or 76 of the spring 70, and the screw 78 and the pin body 80 are located in an adjustment slot 84 located in the first or second plate 22 or 48. To adjust the tension of the spring 70, the user simply unscrews the screw 78 from the pin body 80, moves the pin body 80 along the adjustment slot 84, and then fixes the screw 78 back into the pin body 80.

Without being bound by any particular theory, the relative proximity of the rotation point between the first plate 22 and the second plate 48 and the moveable pin 24 allows the spring 70 the mechanical advantage needed to apply adequate force to deflect a tensioned bandsaw blade 12. The fixed pins 30A and 30B will generally allow enough friction for the tension gauge 20 to hold itself in place against the force of gravity while the spring 70 applies a radial force to the moveable pin 24.

Although the scale illustrated in the drawings is purely mechanical, the scale used may have electronic components, such as an electronic readout.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously.

What is claimed is:

1. A method of measuring the tension of a motorized cutting blade comprising the steps of:
   a) providing a motorized cutting device comprising a cutting blade comprising a plurality of teeth, and a motor configured to move the cutting blade, the cutting blade having a tension;
   b) providing a tension gauge comprising a first plate, a moveable protrusion configured to deflect the cutting blade and attached to the first plate and a scale configured to measure deflection of the moveable protrusion and to notify a user of the tension of the cutting blade based on the measured deflection; and
   c) placing the cutting blade against the moveable protrusion to deflect the cutting blade and cause the scale to provide indicia of the tension of the cutting blade to the user,
   wherein the moveable protrusion is in the form of a moveable pin,
   wherein the first plate comprises a first plate interior surface comprising the moveable pin and a pointer, a first plate exterior surface opposite the first plate interior surface, a first plate first side and a first plate second side opposite the first side, wherein the tension gauge further comprises a second plate comprising a second plate exterior surface comprising at least two fixed pins, a second plate interior surface facing the first plate and opposite the second plate exterior surface, a second plate first side and a second plate second side opposite the second plate first side, wherein the second plate comprises an arc-shaped slot receiving the pointer and the tension indicia, wherein the arc-shaped slot, the pointer and the tension indicia comprise the scale, wherein the first plate is pivotably attached to the second plate by a pivot pin connecting the first plate to the second plate and creating a pivot axis, wherein the second plate further comprises a pin slot receiving the moveable pin, wherein pivoting the first plate relative to the second plate along the pivot axis is configured to cause the pointer to move along the arc-shaped slot and to cause the moveable pin to move along the pin slot to deflect the cutting blade.

2. The method of claim 1, wherein the moveable pin is pressure biased under a pre-loaded force.

3. The method of claim 1, wherein the tension gauge further comprises at least one fixed pin, wherein the cutting blade comprises a first side and a second side opposite the first side and step c) comprises placing the first side of the cutting blade against the moveable pin and the second side of the cutting blade against the fixed pin.

4. The method of claim 3, wherein the cutting blade comprises a third side oriented at approximately 90 degrees relative to the first side and the second side and the teeth are located on the third side.

5. The method of claim 1, wherein step c) comprises placing the cutting blade against the moveable pin and the at least two fixed pins.

6. The method of claim 1, wherein the first plate or the second plate comprises a ruler comprising distance measuring indicia spaced at regular intervals.

7. The method of claim 1, wherein the exterior surface of the first plate comprises a first plate spring stop pin, wherein the exterior surface of the second plate comprises a second plate spring stop pin, wherein the tension gauge further comprises a spring having a first end attached to the first plate spring stop pin, a coil surrounding the pivot pin, and a second end attached to the second plate spring stop pin.

8. The method of claim 7, wherein at least one of the first plate spring stop pin and the second plate spring stop pin comprise a screw and a pin body comprising a threaded interior configured to receive the screw, wherein the pin body is positioned against the first or second end of the spring, and further wherein the screw and the pin body are located in an adjustment slot located in the first or second plate.

9. The method of claim 1, wherein a side of the first plate and an opposite side of the second plate each comprise a handle.

10. The method of claim 1, wherein the cutting blade is a bandsaw blade and in the form of continuous band of toothed metal stretched between at least two wheels.

11. A method of measuring the tension of a motorized cutting blade comprising the steps of;
   a) providing a motorized cutting device comprising a cutting blade comprising a plurality of teeth, and a motor configured to move the cutting blade;
   b) providing a tension gauge comprising a first plate comprising a first plate interior surface comprising a moveable pin and a pointer, a first plate exterior surface opposite the first plate interior surface, a first plate first side and a first plate second side opposite the first plate first side, a second plate comprising a second plate exterior surface comprising at least two fixed pins, a second plate interior surface facing the first plate and opposite the second plate exterior surface, a second plate first side and a second plate second side opposite the second plate first side, wherein the second plate comprises an arc-shaped slot receiving the pointer and the tension indicia, wherein the arc-shaped slot, the pointer and the tension indicia comprise a scale, wherein the first plate is pivotably attached to the second plate by a pivot pin connecting the first plate to the second plate and creating a pivot axis, wherein the second plate further comprises a pin slot receiving the moveable pin;
   c) pivoting the first plate relative to the second plate along the pivot axis from a start position to a second position to cause the moveable pin to move within the pin slot and the pointer to move within the arc-shaped slot;
   d) placing a first side of the cutting blade against the moveable pin and a second side of the cutting blade against the at least two fixed pins; and
   e) pivoting the first plate relative to the second plate along the pivot axis from the second position to a measuring position located between the second position and the start position to cause the moveable pin to move within the pin slot and deflect the cutting blade and to cause the pointer to move within the arc-shaped slot.

12. The method of claim 11 further comprising the step of measuring the location of the pointer after step e).

13. The method of claim 11 further comprising after step e) removing the moveable pin and the at least two fixed pins from the cutting blade.

14. The method of claim 11, wherein the first plate first side comprises a first plate handle comprising a first plate handle flange configured to contact the first side of the second plate when the first plate is in the second position and prevent further pivoting of the first plate away from the start position and further wherein the second plate second side comprises a second plate handle comprising a second plate handle flange configured to contact the second side of the first plate when the first plate is in the second position and prevent further pivoting of the first plate away from the start position.

15. The method of claim 11, wherein the first and second plates are generally flat.

16. The method of claim 11, wherein the interior surfaces of the first and second plates are generally flat.

17. The method of claim 11, wherein the interior surfaces of the first and second plate are less than 0.25 inches apart.

\* \* \* \* \*